July 21, 1959 P. G. CARLSON 2,895,295
VARIABLE SPEED GAS TURBINE
Original Filed April 4, 1952 4 Sheets-Sheet 1
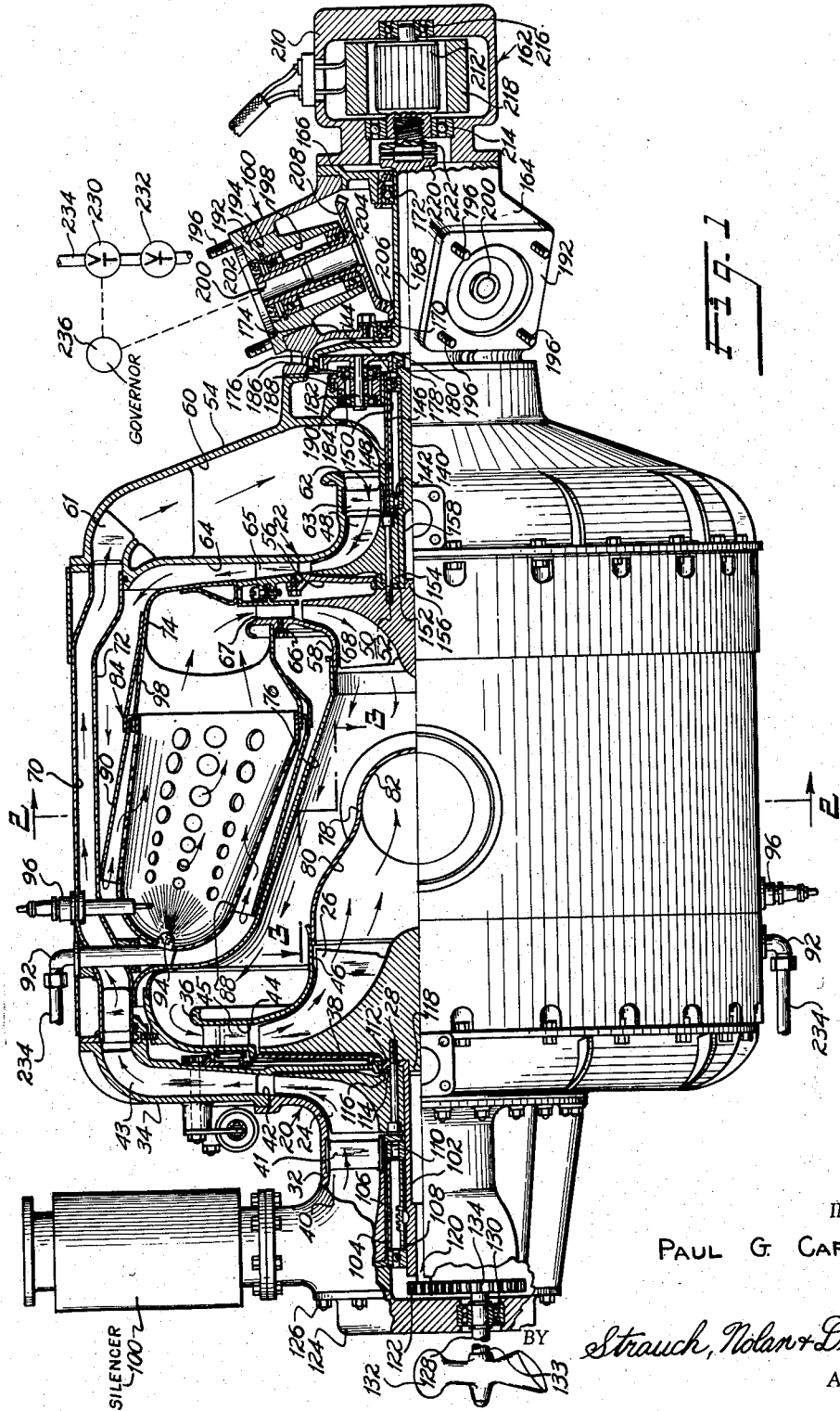
INVENTOR
PAUL G. CARLSON
BY Strauch, Nolan & Diggins
ATTORNEYS

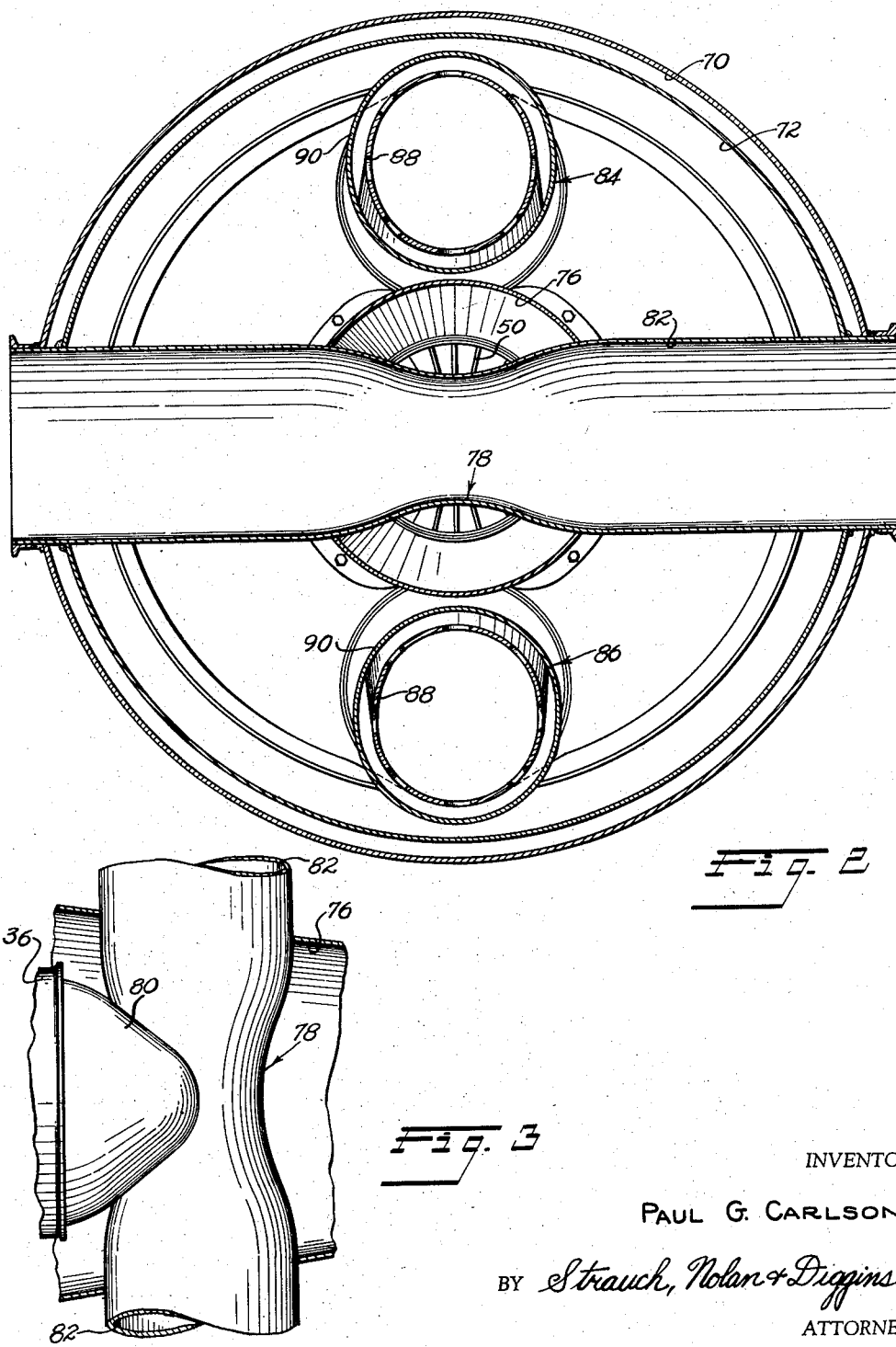

July 21, 1959 P. G. CARLSON 2,895,295
VARIABLE SPEED GAS TURBINE
Original Filed April 4, 1952 4 Sheets-Sheet 4
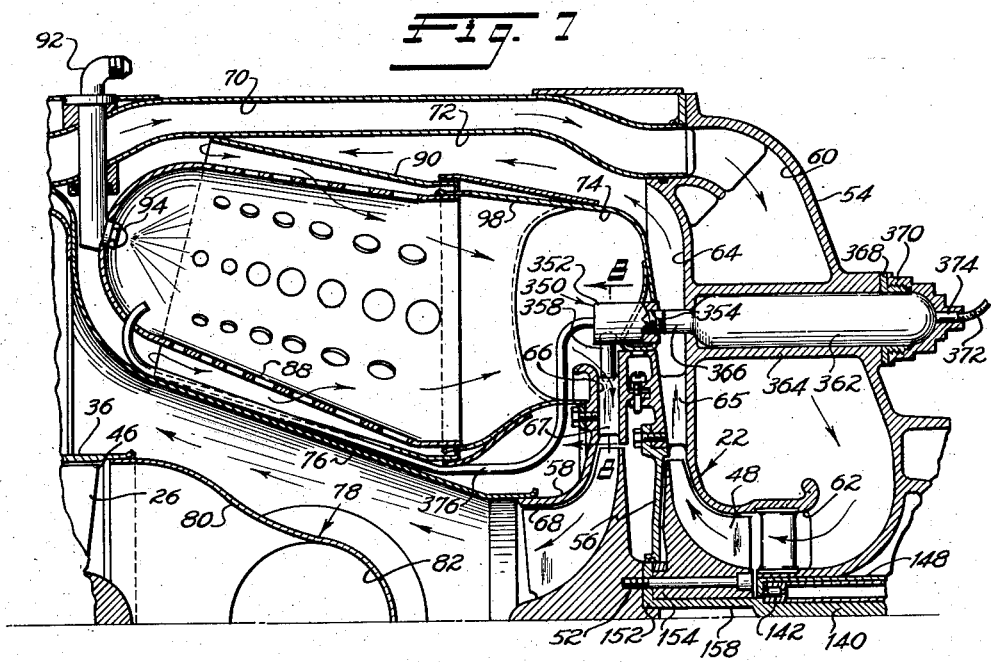
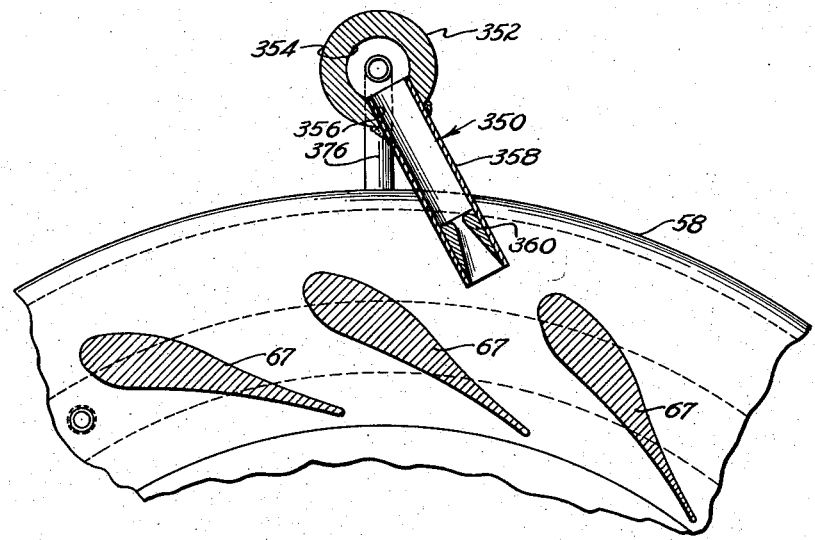
INVENTOR
PAUL G. CARLSON
BY Strauch, Nolan & Diggins
ATTORNEYS United States Patent Office 2,895,295
Patented July 21, 1959

2,895,295

VARIABLE SPEED GAS TURBINE

Paul G. Carlson, San Diego, Calif., assignor to Solar Aircraft Company, San Diego, Calif., a corporation of California Original application April 4, 1952, Serial No. 280,523. Divided and this application July 26, 1956, Serial No. 602,949

20 Claims. (Cl. 60—39.16)

This invention relates to gas turbine power plants, and has particular reference to a compact variable speed gas turbine especially adapted for use as a marine propulsion unit or as auxiliary gas turbine compressor unit in aircraft. This application is a division of Serial Number 280,523 filed April 4, 1952, now abandoned.

The invention comprises a gas turbine power plant having a novel and highly practical dual compressor turbine arrangement. This novel arrangement results in a power unit which is compact, light weight and at the same time very efficient. Because the power plant is relatively small and light for the horsepower developed it is particularly adapted for small boat propulsion or use in aircraft where these factors are of material importance. It will be apparent as the description proceeds, however, that the invention is not restricted to marine or aircraft use but has many other practical applications.

One of the principal features of the gas turbine power plant disclosed herein is a novel annular plenum chamber surrounding the combustion chambers and providing air thereto. This construction eliminates the need for the complicated and hard to fabricate scrolls common to most single and twin combustion chamber turbines and results in a simplified and less expensive unit.

The power plant of the invention also provides a unique dual compressor-turbine arrangement wherein the low and high pressure rotor assemblies are coaxially yet independently rotatably mounted.

The independent mounting of the rotor assemblies permits the low pressure assembly to be used to develop shaft horsepower to drive a boat propeller, in one preferred embodiment of the invention, while the high pressure assembly may be advantageously used, in addition to providing the necessary high pressure air to the combustion chambers, as an auxiliary drive for oil and fuel pumps and the like thereby eliminating the necessity for separate motors for fuel and oil pumps or other auxiliary equipment. This construction together with the novel plenum chamber arrangement results in a very compact and efficient unit as will become apparent as the description proceeds.

In the past, gas turbine power plant arrangements have been proposed in which mechanically independent high and low pressure compressor-turbine units were provided, in which the power output of the power plant was taken from the high pressure unit, and in which a variable nozzle was provided for varying the velocity of impingement of the working medium upon the blades of the low pressure-turbine so that the power output of the power plant as a whole could be controlled by varying the nozzle. Examples of this prior art form of power plant will be found in United States Letters Patent Nos. 2,312,605 and 2,361,887 issued to W. Traupel for Gas Turbine Plant on March 2, 1943, and October 31, 1944, respectively.

It is an important object of this invention to provide a gas turbine power plant which, in the disclosed embodiment may be considered to be of the same general type as those disclosed in the aforesaid Traupel patents but which embodies certain improved features not heretofore known which increase the field of utility of such power plants by providing a greater versatility in operation, by permitting a more compact power plant structure and by greatly simplifying the mode of manufacture and assembly with a resultant reduction in unit cost.

In accordance with this general object to increase the field of utility of power plant of this general type, it is an ancillary object of this invention to provide an improved power plant in which the power output cannot only be varied but its direction can be completely reversed without the use of clutches or reverse gearing. This feature of the invention renders the power plant readily adaptable for use in vehicles such as small boats or the like.

More specifically it is an ancillary object of this invention to accomplish the foregoing object of power output or drive reversibility by providing a novel combination of radial flow turbine and adjustable inlet nozzle construction by which the velocity and angle of impingement of the working medium upon the turbine rotor blades can be so controlled that the turbine rotor may be driven in either a forward or reverse direction or may remain stationary.

A further object of this invention is the provision, in a gas turbine power plant, of an improved compound compressor-turbine arrangement by which starting of the unit is facilitated by the provision of means whereby loading effect of one of the compressor-turbine units can be effectively removed from the system while the other compressor-turbine unit is brought up to speed to provide the necessary compressed air to the combustion chambers to maintain combustion.

With the foregoing and other considerations in view, it is a general object of this invention to provide a compact and efficient gas turbine power plant particularly adapted for marine and aircraft use.

A more specific object of the invention is to provide a compact and efficient gas turbine power plant for use as a small boat propulsion means.

Another object of the invention is to provide a compact and efficient gas turbine power plant for use as an auxiliary compressor unit in an aircraft.

A further object of the invention is the provision of a gas turbine power unit having a simplified annular plenum chamber surrounding its combustion chambers and supplying air thereto.

Another object of the invention is to provide a gas turbine power unit having a dual compressor-turbine arrangement.

A further object of the invention is to provide a gas turbine power unit having a simplified speed varying and reversing means.

A still further object of the invention is the provision of a gas turbine power unit wherein the low pressure rotor asembly may be varied as to speed or reversed as to direction of rotation by means of a simple variable nozzle arrangement.

Another object of the invention is the provision of a gas turbine power unit wherein the high pressure and low pressure rotor asemblies are coaxially but independently mounted so that shaft horsepower may be derived from each for independent uses.

These and other objects and advantages of the present invention will become apparent from the following description in conjunction with the appended claims and the accompanying drawings wherein like reference numerals have been used to designate like parts throughout the several views and wherein:

Figure 1 is a partially sectioned side elevation view of a preferred embodiment of gas turbine type power plant constructed in accordance with the principles of the present invention;

Figure 2 is a sectional view of the power plant of Figure 1 taken along the line 2—2 of Figure 1;

Figure 3 is a view taken substantially along the line 3—3 of Figure 1 illustrating the structural formation of the exhaust duct from the low pressure turbine;

Figure 4 is an enlarged fragmentary view of the low pressure unit peripheral compressor outlet and turbine inlet openings illustrating the structure for controlling the speed of the low pressure unit rotor assembly;

Figure 5 is a fragmentary sectional view portions of which are broken away to better illustrate the variable nozzle structure at the inlet to the low pressure turbine for controlling the direction and velocity of rotation of the low pressure rotors;

Figure 6 is a fragmentary view illustrating a modified structure for manually driving the high pressure rotors during initiation of power plant operation in lieu of the starting motor drive illustrated in Figure 1;

Figure 7 is a fragmentary longitudinal sectional view of a power plant assembly similar to that of Figure 1 but embodying modified starting drive and combustion ignition arrangements; and Figure 8 is a fragmentary sectional view of such modified structure taken along the line 8—8 of Figure 7.

General

The gas turbine power plant of the present invention, the preferred embodiment of which is shown in Figure 1, comprises in general a low pressure compressor-turbine assembly 20, a high pressure compressor-turbine assembly 22, and housing structure formed predominantly of sheet metal and defining channels directing the working fluid between these two assemblies.

The low pressure assembly 20 includes a radial flow compressor rotor 24 and a radial flow turbine rotor 26 which are suitably secured together in back to back relation for concomitant rotation as by screws 28. These rotors of the low pressure unit are surrounded by a casing structure formed of casing members 32, 34, 36 and 38. These casing members coact to define an annular axially directed low pressure compressor inlet channel 40 having conventional guide vanes 41 fixed therein, a generally annular peripheral outlet opening 42 therefor having conventional guide vanes 43 fixed therein, an annular turbine inlet opening 44 peripherally disposed about rotor 26 adjacent opening 42 and having adjustable guide vanes 45 disposed therein in a manner and for a purpose to be described in detail presently, and an axially directed turbine outlet opening 46.

The high pressure assembly 22 similarly includes a radial flow compressor rotor 48 and a radial flow turbine rotor 50 which are suitably secured together in back to back relation by screws 52. Rotors 48 and 50 of the high pressure assembly are surrounded by a casing structure formed of casing members 54, 56 and 58. Casing member 54 defines an annular radially extending channel 60 having conventional guide vanes 61 fixed at the inlet thereof and an annular axially extending high pressure compressor rotor inlet opening 62 having conventional guide vanes 63 fixed therein. Casing member 54 coacts with member 56 to form an annular radially extending compressor outlet opening 64 in which are conventionally fixed guide vanes 65. Members 56 and 58 define an annular radially extending high pressure turbine rotor inlet opening 66, in which are fixed conventional guide vanes 67, while member 58 forms an axially directed high pressure turbine outlet opening 68.

The casing structures of the low and high pressure assemblies are interconnected by a fluid guide structure preferably formed predominantly of sheet metal components. This fluid guide structure defines a generally toroidal channel 70 which interconnects the outlet channel 42 from the low pressure compressor with the channel 60 leading to the inlet opening 62 of the high pressure compressor, a generally toroidal chamber or plenum 72 which is coaxial with and surrounded by channel 70 and into which working fluid is discharged from the high pressure compressor rotor 48 via channel 64, a second toroidal chamber or plenum 74, which is disposed within the plenum 72 at one end in surrounding relation to and which is in direct communication with the annular high pressure turbine inlet 66, and a somewhat conically shaped channel 76 leading from the axial outlet opening 68 of the high pressure turbine rotor 50 to the peripheral annular inlet 44 of the low pressure turbine rotor. The exhaust from low pressure turbine rotor 26 passes through opening 46 into a T-shaped exhaust duct 78 having a short leg forming a channel 80 which is coaxial with the turbine rotor 26 and opening 46 and which is of diminishing cross-sectional area, and a cross channel 82 which is of increasing cross-sectional area, best shown in Figures 2 and 3, into which channel 80 discharges and which extends to the exterior of the assembly through channel 76, plenum 72, and channel 70. The cross channel 82 of duct 78 constitutes practically the sole discontinuity in the generally toroidal configuration of channels 70 and plenum 72.

In accordance with the present invention, combustion chamber means are so disposed within the toroidal plenum 72 as to receive compressed air therefrom and are connected to discharge into plenum 74 thus providing a compact, relatively inexpensive structure. In the preferred embodiment of the invention, such combustion chamber means comprises a pair of identical combustion chamber assemblies 84 and 86 (Figure 2) which are mounted within plenum 72 at diametrically opposed positions relative to the axis of the power plant assembly.

Combustion chamber assembly 84 is shown in longitudinal cross-section in Figure 1. As is therein shown, assembly 84 includes a perforate generally annular wall 88, which is closed at its end adjacent the low pressure assembly 20 and open at its opposite end, and an imperforate wall 90, which surrounds perforate wall 88 and forms a shroud spaced therefrom, open at its end adjacent the low pressure assembly 20 and closed at its opposite end. The generally cylindrical shroud 90 surrounding the combustion chamber liner or perforate wall 88 serves to direct air from the plenum chamber 72 along the exterior of the wall 88 tending to cool it. The flow directly along wall 88 promotes scrubbing action and improved heat transfer. As the air passes through the holes in wall 88, it rubs the inner surface of wall 88 forming a boundary layer of insulating cool air and preventing the full heat of combustion from reaching wall 88.

A fuel injector 92 extends from the exterior of the power plant assembly through channel 70 and into plenum 72 in fluid tight relation with the walls thereof wherein it terminates in a nozzle 94 projecting through the closed end of wall 88 to direct fuel coaxially into the combustion chamber defined by wall 88. A fuel ignition means 96, which, in the embodiment of Figure 1, is a spark plug of a type conventional to gas turbine power plant combustion chambers which is connected to a suitable source of electrical energy, is so mounted through the perforate wall 88 that it is disposed adjacent the nozzle 94 to effect ignition of the injected fuel upon initiation of power plant operation.

A suitably formed sheet metal member defining a duct 98 interconnects the open end of perforate wall 88 with the toroidal plenum 74 to smoothly direct and distribute the combustion products or working fluid in such plenum 74 for substantially uniform entry through annual opening 66 into the channels through the blading of high pressure turbine rotor 50.

From the foregoing general description, it is apparent that, while both the high pressure and low pressure compressor turbine assemblies are in operation, air is drawn into the annular low pressure compressor inlet channel 40 through a suitable silencer 100, compressed during its passage through rotor 24, and discharged through outlet opening 42 whence it passes via the toroidal channel 70 and the radially extending channel 60 to the inlet opening 62 of the high pressure compressor. The air is further compressed during its passage through the high pressure compressor rotor 48 and discharged through the outlet opening into the plenum 72.

The compressed air in plenum 72 enters the combustion chamber defined by wall 88 through the end opening of shroud 90 and the perforations of wall 88. The air is mixed with the injected fuel, heated by the combustion thereof, and discharged through duct 98 into the second plenum 74. The working fluid consisting of the products of combustion and any excess air passes from plenum 74 through inlet opening 66 and expands through the high pressure turbine rotor 50 which extracts sufficient energy there from to drive compressor rotor 48 and any auxiliaries or accessories such as a fuel pump, a governor, lubricating oil and scavenger pumps or a tachometer generator that may be coupled thereto. The working fluid discharged through opening 68 from turbine rotor 50 passes through channel 76 around duct 78, through annular opening 44 to the low pressure turbine rotor 26, and after the extraction of energy by rotor 26 to drive the power plant power output shaft, is exhausted through the channels 80 and 82 of duct 78.

By this improved fluid guide structure the various plenums, channels, and ducts are located compactly one within another resulting in a great reduction in the overall bulk of the power plant. The plenums, channels, and ducts are of such configuration that they may be formed by sheet metal parts thereby resulting in a reduction of the cost and weight of the power plant as compared with those in which complex scrolls are necessary. The arrangement of a shrouded combustion chamber disposed within one annular plenum and discharging into a second annular plenum also disposed within the first plenum is of particular importance in contributing to the compactness of this power plant.

*Low pressure assembly rotor mount and power output arrangement*

As has been pointed out previously rotors 24 and 26 of the low pressure assembly 20 are secured together for concomitant rotation. Rotors 24 and 26 are mounted upon one end of a hollow shaft 102 which is journalled for rotation within a sleeve 104 in a through bore 106 of casing member 32 by spaced anti-friction bearings 108 and 110. The end of shaft 103 is formed with an integral radially extending flange 112 which is clamped between the end face of an annular boss 114 integral with rotor 24 and the adjacent flat end face of rotor 26 and which terminates in a reversely directed cylindrical portion 116 defining an annular channel into which annular boss 114 is piloted to reduce the shear load upon screws 28. The end face of rotor 26 is formed coaxially with an integral boss 118 piloted within the open end of hollow shaft 102 for a similar purpose. It is thus seen that rotors 24 and 26 are rotatably mounted by a cantilever support at the compressor end opposite the location of the heated working fluid channels 50, through, and from the turbine rotor 26.

A solid shaft 120 is suitably fixed within the end of hollow shaft 102 opposite that at which the rotors 24 and 26 are mounted, and has an end portion projecting beyond the end of shaft 102. A pinion 122 is fixed to this projecting end portion. The end opening of casing member 32 is closed by an end plate 124 which is secured thereto as by bolts 126 and in which is journalled a power output shaft 128 by an anti-friction bearing 130. When this power plant is utilized as a propulsion unit for a small boat or the like, power output shaft is suitably drive connected to a screw type propeller 132 as by a propeller shaft 133. A gear 134 which is fixed upon the inner end of output shaft 128, meshes with pinion 122 on shaft 120 to complete the drive train between rotor shaft 102 and the propeller 132.

*High pressure assembly rotor mount and accessory drive arrangement*

Rotors 48 and 50 are rotatably mounted coaxial with rotors 24 and 26 in a cantilever support at the compressor end. Rotors 48 and 50 of the high pressure assembly are fixed upon the end of a shaft 140 which is journalled by spaced anti-friction bearings 142 and 144 within a sleeve 146 fixed in coaxially aligned bores 148 and 150 through the casing member 54. Shaft 140 is formed with a radially extending flange 152 which is clamped between the flat end face of rotor 50 and the end face of an annular boss 154 integral with the adjacent end face of rotor 48 by screws 52. Rotor 50 has an integral boss 156 piloted within an end bore 158 in shaft 140 and annular boss 154 is piloted within an annular channel formed by the cylindrical outer edge of flange 152 to assure concentric alignment and to minimize the shear stress upon the screws 52 during high velocity rotation of the rotors. Due to the cantilever mounting of the rotors and the improved fluid guide structure arrangement the rotor bearings are shielded from the hot gases which are confined between the rotors.

Mounted at the high pressure end of the power plant assembly in alignment with the rotor shaft 140 are an auxiliary or accessory drive power take-off unit 160 and a starting motor unit 162. The accessory drive power take-off unit 160 comprises basically a housing 164 which is secured by suitable means to the casing member 54, an end plate 166 piloted within an end opening in and secured to housing 164; and a hollow shaft 168 journalled for rotation coaxial with shaft 140 by spaced bearings 170 and 172 mounted within coaxial bores through a traverse wall 174 of housing 164 and the end plate 166.

Shaft 168 is driven during normal operation by shaft 140 through a reduction gear arrangement now to be described. A large internal annular gear 176 is formed integral with the end of shaft 168 at its end adjacent shaft 140. A gear 178 is fixed upon that end of shaft 40 in alignment with and disposed within the path of rotation of gear 176. Gears 176 and 178 are drivingly interconnected by a plurality of planet gears 180, which are in constant mesh with both gears 176 and 178, and which are journalled for rotation within bores 182 in casing member 54 by anti-friction bearings 184 and 186 about axes equiangularly disposed about and parallel to the common axis of shafts 140 and 168. Bearings 184 and 186 are mounted within bores 182 by a suitable retainer 188 while gears 180 are fixed to the end of shaft 190 which are rotatably mounted therein by such bearings.

A plurality of power take-off shaft carriers 192 are mounted upon housing 164 in preferably equiangularly disposed relation about and inclined relative to the axis of shaft 168, being piloted within bores 194 of housing 160 and secured thereto by stud bolts 196. Each carrier 192 is formed with a through bore 198 in which is journalled a hollow power take-off shaft 200 by spaced anti-friction bearings 202 and 204. The axes of shafts 200 intersect but are inclined relative to the axis of shaft 168 as shown. Shafts 200 are geared to shaft 168 by the meshing engagement of a bevel pinion 206 fixed upon the shaft 168 with each of the bevel gears 208 which may be formed integral with or otherwise suitably fixed to the adjacent ends of hollow shafts 200. In this manner, therefore, the power take-off shafts 200 are each drive connected to the high pressure assembly rotor shaft 140.

The starting motor unit 162 consists basically of a housing 210, an electric motor having a rotor 212 journalled in housing 210 by spaced anti-friction bearings 214 and 216 and a surrounding stator winding 218, and a clutch operative to interconnect the rotor 212 to the shaft 168. The clutch is preferably formed by a pair of coacting ratchet type unidirectional clutch members 220 and 222, member 220 being fixed upon the end of shaft 168 and member 222 being threadedly received within an axially aligned tapped hole in the adjacent end of the shaft of rotor 212. The direction of spiral of the threaded engagement between the shaft of rotor 212 and clutch member 222 and the direction of driving engagement of clutch members 220 and 222 are so related to the common normal direction of rotation of the rotor 212 and shaft 168 that, in starting, the member 222 will move into engagement with the member 220 to drive the shaft 168 and, through the interconnecting gearing, the rotor shaft 140, and remain in such engagement until sufficient compression is developed in plenum 72 and the combustion chamber assemblies 184 and 186 to initiate and maintain combustion. Once combustion has been established, the turbine rotor 50 will be gradually brought up to operating speed. As the speed of the rotors 48 and 50 increases the angular velocity of shaft 168 will overrun its drive from motor rotor 212 to effect disengagement of clutch members 220 and 222 by threading clutch member 222 back into the tapped hole in shaft of rotor 212 to a position such as that illustrated. Once combustion is established and the engine is accelerated to self sustaining speed, operation of the starting motor can be terminated.

*Rotor speed control*

The speed of the rotors 48 and 50 of the high pressure unit 22 is controlled primarily by throttling the quantity of fuel injected into the combustion chamber assemblies 84 and 86 while the speed of the rotors 24 and 26 of the low pressure unit 20 is controlled primarily, in either direction of rotation, by adjustment of the variable guide vanes 45 disposed in the annular inlet 44 to the low pressure turbine rotor 26 to control the velocity and angle of incidence of the working fluid upon the blades of rotor 26. In marine use, the fuel throttling and control of the guide vanes 45 are preferably handled by integrated controls for starting in the neutral position, and then handled by a single throttle for varying forward speeds, and for neutral and reverse. It has been found that such interconnection of the speed control on the high pressure rotor with the nozzle or guide vane setting on the low pressure rotor permits the achievement of better part load economy. By this interconnection, a relationship between high pressure rotor speed and low pressure turbine inlet nozzle area can be established which, for any given power output requirement, will be optimum.

For certain other purposes, it has been found desirable to provide a constant speed control for the high pressure unit and an independent variable control for the low pressure unit. For these purposes, a pair of serially arranged throttle valves 230 and 232 may be interposed in the fuel supply line 234 leading from a suitable pressurized fuel supply (not shown) to the injectors 92. Throttle valve 232 is manually controlled and is utilized in controlling the rate of fuel introduction during the period when the rotors 48 and 50 are being brought up to their normal operating speed which, in the disclosed embodiment, is approximately forty-two thousand revolutions per minute. Throttle valve 230 is controlled by a suitable velocity responsive governor diagrammatically indicated at 236 which is drive coupled to one of the power take-off shafts 200. After the rotors 48 and 50 are brought up to their normal operating speed, they are retained at such speed under the control of governor 236.

For controlling the speed and direction of rotation of the low pressure unit rotors 24 and 26 independently of that of the constant speed high pressure rotors, a novel variable nozzle arrangement has been provided by which the velocity and angle of impingement of the working fluid upon the blades of turbine rotor 26 can be so controlled as to drive rotor 26 at varying velocities in either direction or to retain rotor 26 stationary while the working fluid passes therethrough to the exhaust duct 78.

This variable nozzle is formed by a plurality of working fluid guide vanes 45 which are symmetrically mounted within the annular turbine inlet opening 44 for pivotal movement about axes parallel to and equiangularly disposed about the axis of rotation of turbine rotor 26. The mounting and mode of operation of these guide vanes 45 will best be understood by reference to the enlarged views of this structure in Figures 4 and 5.

As shown in Figures 4 and 5, vanes 45 are in their neutral position in which they are effective to so direct the working fluid toward the turbine rotor 26 that the working fluid will pass through the blading thereof without imparting rotation thereto.

Simultaneous pivotal movement of the vanes 45 from their neutral positions will produce a progressive increase in the velocity and angle of incidence of the working fluid upon the rotor blades. The direction of rotation of rotor 26 is controlled by the direction in which vanes 45 are pivoted from their neutral positions.

Guide vanes 45 are fixed upon shafts 242 which are journalled through the spaced radially extending walls 244 and 246 of casing member 36 which define the inlet opening 44. A fixed guide vane 248 is associated with each pivotable guide vane 45 to initially direct the working fluid to provide a smoother pattern of flow than would otherwise be possible when the vanes 45 are pivoted toward either of their extreme angular positions from the neutral position in which they are illustrated. Associated with each pivotable guide vane 45 is a crank or arm 250 which has a crank pin 252 fixed thereto at one end and which is fixed at its other end to the end of each shaft 242 which projects through the wall 246.

A servomotor controlled common actuator is provided for simultaneously adjusting the guide vanes 45 about their respective pivot axes through the mediation of arms 250. In the preferred embodiment, the common actuator is a ring 254 in which is coaxially formed a recess 256 within which is received an annular ledge 258 projecting from the wall 246 toward casing member 34. The engaged cylindrical surfaces of recess 256 and ledge 258 provide a rotary mount for ring 254 upon casing member 36. The arms 250 are operatively connected for simultaneous actuation to ring 254 the engagement of each of the pins 252 with one of a plurality of equiangularly spaced radially extending slots 260 formed through ring 254. Due to this operative engagement of pins 252 with the slots 260 of ring 254, rotary movement of ring 254 will produce pivotal movement of the vanes 45 about their respective pivot axes.

Rotary actuation of ring 254 is controlled by a servomotor 262 which is mounted upon the exterior of casing member 34 and which is controlled and energized in the conventional manner. The operating linkage interconnecting servomotor 262 with the actuator ring 254 comprises a piston rod 264 directly actuated by the servomotor 262, a master crank arm 266 pivotally connected to rod 264 at one end and fixed upon the outwardly projecting end of a shaft 268 which is journalled within a bore 269 through casing member 34, a pinion 270 fixed upon the opposite end of shaft 268 and a plurality of gear teeth 272 formed upon at least a segment of the periphery of ring 254 and in constant mesh with pinion 270.

From the foregoing it is apparent that actuation of master crank arm 266 in a counterclockwise direction about the axis of shaft 268 as viewed in Figure 5 will produce counterclockwise movement of each of the guide vanes 45 from their illustrated neutral positions. Movement of the guide vanes in this direction causes the working fluid passing through the annular inlet opening 44 to so impinge upon the blades of rotor 26 as to impart rotation to rotor 26 in its normal or forward direction, that is, as applied to a small boat, that direction of rotation to rotor 26 that will so drive propeller 132 as to impart forward movement to the boat.

In the positions in which the guide vanes 45 are shown in Figure 5, they are effective to direct the working fluid entering through annular opening 44 in substantially radially directed streams toward the axis of rotation of rotor 26 so that the working fluid passes through the rotor blading to the exhaust duct 78 without imparting rotation thereto.

As the guide vanes are progressively actuated in a counterclockwise direction about their respective pivot axes, the cross-section of the opening between each adjacent pair of vanes 45 becomes progressively smaller resulting in an increase in velocity of the working fluid passing therethrough. Also as the vanes 45 are progressively pivoted in this manner, the angle of incidence of the working fluid upon the radially extending portions of the blades of rotor 26 progressively increases thereby increasing the rotation producing component of the force exerted upon the blades of rotor 26 by the working fluid.

The cross-sectional configuration of the guide vanes 45, illustrated in Figure 5, is such that the working fluid is directed thereby through the annular inlet opening 44 with minimum turbulence. It should be noted that the axially extending portions of the turbine rotor blades are curved in the direction opposite to the direction of rotor rotation in the conventional manner to permit axial discharge into exhaust duct 78 with minimum turbulence and to produce maximum efficiency of operation in the normal forward direction of rotor rotation.

Pivotal movement under the control of servomotor 262 of master crank arm 266 in a clockwise direction from the position in which it is illustrated in Figure 5 will cause clockwise movement of the guide vanes 45 about their respective pivot axes. Progressive pivotal movement of guide vanes 45 in this direction will progressively increase the velocity and angle of impingement of the working fluid upon the radially extending portions of the blades of rotor 26. It will be noted that when the vanes 45 are so shifted, the working fluid will impinge upon the faces of the rotor blades which are leading in the normal or forward direction of rotor rotation. The rotation producing component of the force exerted by the working fluid upon the rotor blades is thus so directed as to impart rotation to rotor 26 in the direction opposite to the normal forward rotation produced when the vanes were shifted in the opposite direction. This reverse direction of rotor rotation is such that the screw propeller would drive a small boat rearwardly. In either direction of rotation, the progressive pivotal movement of the guide vanes 45 from their illustrated neutral positions results in an increase in the energy extraction and thereby an increase in power delivered to the output shaft 128.

It is apparent that, due to the cross-sectional configuration of the guide vanes 45 and the above described shape of the rotor blades at their discharge ends, the efficiency of energy extraction from the working fluid by the rotor 26 will be considerably greater when the rotor is driven in the normal or forward direction than when it is driven in the reverse direction. In installations such as small boats or other similar vehicles, this not only is not objectional but is highly desirable because by far the most usual direction of drive is forward. Thus maximum efficiency of energy extraction is available for the principal direction of drive while, due to the infrequency of use of the reverse drive, the less efficient drive in that direction is not of any practical importance.

While the disclosed embodiment operating in the manner just described is the preferred and more usual form of variable nozzle in accordance with the invention, the modification of the configuration of the discharge ends of the turbine rotor blades and the guide vane configuration to provide equal efficiency of energy extraction by the turbine rotor 26 in both directions of rotor drive is within the ambit of the present invention. The stationary guide vanes 248 may be omitted if desired but such omission would result in less efficient operation, particularly when vanes 45 are in their reverse drive positions.

The guide vanes 45 are set in their illustrated neutral positions during normal power plant operation when it is desired not to drive the power output shaft 128 in either direction and, upon initiation of operation of the power plant by driving rotors 48 and 50 from the electrical starting motor in the manner previously described, to unload low pressure compressor-turbine assembly from the system by providing minimum resistance to flow therethrough. For this latter purpose, the guide vanes 45 are set in their neutral positions prior to initiation of drive by the starting motor and are maintained in such positions until combustion has been established in the combustion chambers and the low pressure rotor has been brought up to its normal operating speed.

*Manual power plant starting mechanism*

In Figure 6 a manually operated starting unit 300 is shown. This unit may be mounted upon the end of the power take-off unit 160 of Figure 1 in lieu of the electrical starting motor unit 162 for installations in which a source of electrical energy is not available.

In the manually operative starting unit 300, the clutch member 222 is threaded into a hole 304 formed in the adjacent end of a member 306 which is journalled for rotation within a housing 308 coaxial with clutch member 220 by spaced antifriction bearings 310 and 312. Housing 308 is secured to end plate 166 and power take-off unit housing 164 in the same manner as is starting motor housing 210 of Figure 1.

Member 306 is driven through a reduction gear train from a hand crank 314 which is journalled by antifriction bearings 316 and 318 in the transverse wall of an end plate 320 suitably fixed upon the end of housing 308. The reduction gear train interconnecting crank 314 with member 306 comprises an internal annular gear 322, which is fixed upon the shaft 324 of crank 314 within a chamber 326 defined between end plate 320 and housing 308, an aligned gear 328, which is fixed upon the end of member 306 projecting into chamber 326, and a plurality of planet gears 330 which are in constant mesh with both gears 322 and 328 and which are fixed upon shafts 331 journalled for rotation by antifriction bearings 332 upon housing 308 about axes parallel to and preferably equiangularly disposed about the axis of rotation of member 306.

The operation of clutch member 222 when driven by crank 314 is exactly the same as its operation when driven by the motor rotor 212 which was described in detail earlier in this description.

When no external electrical energy source is available, a magneto 334, which is mounted upon housing 308 and which is driven from one of the shafts 331 through bevel gears 336 and 338, is connected to the spark plugs 96 to provide the necessary spark for igniting the fuel injected into the combustion chamber assemblies 84 and 86 (Figure 2) upon initiation of power plant operation.

*Cartridge starting of power plant*

In certain instances, it is contemplated that a power plant constructed in accordance with the principles of this invention will be used on a standby basis as an auxiliary power plant. For such purposes, it has been found that a cartridge type starting arrangement, which serves not only to drive the high pressure unit rotors to establish the necessary initial compression in the combustion chambers but also provides for the initial ignition of the injected fuel, is most suitable.

The basic power plant of the present invention as modified to include such a cartridge type starting arrangement is shown in Figures 7 and 8.

In order to drive the high pressure unit rotors 48 and 50, a plurality of nozzle assemblies 350 are so mounted within the plenum 74 about the periphery of the high pressure turbine rotor 50 as to direct gaseous jets between the stationary guide vanes 67 in the high pressure turbine inlet opening 66 against the radially extending portions of the blades of the high pressure turbine rotor 50. The nozzle assemblies 350 are all alike, the detailed construction of one of such nozzles being best illustrated in Figure 8, and are preferably equiangularly disposed about the axis of rotor 50. In practice, four such nozzles have proved to produce highly satisfactory starting of the power plant.

The nozzle assemblies 350 each comprise a member 352, which is preferably cylindrical and formed with intersecting end and radial bores 354 and 356, a tubular member 358, one end of which is fixed within the radial bore 356 as by welding, and a converging-diverging nozzle member 360 which is fixed within the opposite or outlet end of tubular member 358 and which forms and directs the gaseous jet between the stationary guide vanes 67.

A cartridge unit 362 (Figure 7), which contains a charge of a suitable solid fuel such as Ballastite, is associated with each of the nozzle assemblies 350, being received within a tubular portion 364 of casing member 54 which extends between the walls thereof which define channel 60 and being formed with an elongated neck 366 which extends across the high pressure compressor outlet opening 64 and is threaded into the end bore 354 of member 352. Cartridge 362 is held in position within the casing member tubular portion 364 by a bushing 368 which is fixed to casing member 54 and by a cap 370 which is threaded upon bushing 368.

The fuel within cartridges 362 is ignited by the application of electrical energy to the metallic casing thereof through an electrical lead 372 and a resiliently biased contact 374 which abuts against the end of cartridge 362 and to which lead 372 is connected.

Upon ignition of the solid fuel within cartridges 362, a jet of burning gas will be discharged from each of the nozzle assemblies 350 against the blades of turbine rotor 50 to drive rotors 48 and 50 and thereby produce the necessary degree of compression within plenum 72 for the initiation of combustion within the combustion chamber assemblies 84 and 86.

In this form of starting arrangement, ignition of the fuel injected through injectors 92 is conveniently effected by the provision of a conductor tube 376 which at one end opens into the end bore 354 of member 352 (Figure 8) and at the other end opens into the combustion chamber adjacent the fuel injector nozzle 94. A small portion of the burning gas from cartridges 362 is conducted from bore 354, through tube 376 to the combustion chamber to ignite the injected fuel.

Conclusion

Three starting arrangements have been disclosed and described. It is contemplated that the cartridge type starter would be preferable for standby auxiliary aircraft use, that the manually driven starter would be preferable for portable airborne or ground units, and that the electrical motor starter would be preferable for marine installations.

From the foregoing detailed description it is apparent that a light weight, compact, relatively inexpensive gas turbine type power plant has been provided which fulfills the several objects set forth at the outset of this description. Particularly, this power plant is highly flexible in its operation in that the speed and direction of rotation of the output shaft can be controlled without the use of clutches or change-speed gearing and is compact and relatively inexpensive as a result of the shape and arrangement of the fluid channels between the compressor-turbine units which are defined predominantly by sheet metal components suitably interconnected by sealed expansion joints.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A compact, light weight gas turbine power plant adapted to provide independently controllable main and auxiliary power outputs while maintaining efficient combustion and energy extraction, said power plant comprising a power plant casing, first and second coaxially aligned mechanically independent compressors disposed within said casing; first and second mechanically independent turbines disposed within said casing intermediate said compressors and coaxially aligned therewith; means mechanically coupling said first and second turbines to said first and second compressors respectively to form respectively mechanically independent low and high pressure compressor-turbine units; main and auxiliary power output drives connected respectively to said low and high pressure units; fluid guide structure connecting the outlet of said first compressor with the inlet of said second compressor, the outlet of said second compressor with the inlet of said second turbine and the outlet of said second turbine with the inlet of said first turbine; combustion chamber means interposed in the path of fluid flow between the outlet of said second compressor and the inlet of said second turbine, and means at the inlet of said first turbine for controlling the speed and direction of rotation thereof independently of the speed of said second turbine.

2. In a gas turbine power plant, a pair of mechanically independent compressor-turbine assemblies each having a unitary rotor formed with a compressor section and a turbine section, a cantilever support at the compressor section end of each of said rotors journalling said rotors, said rotors being disposed between said cantilever supports; a housing for said rotors having fluid channels therethrough interconnecting seriatim the outlet of the compressor section of one of said assemblies with the inlet of the compressor section of the other, the outlet of the compressor section of said other assembly with the inlet of the turbine section thereof, and the outlet of the turbine section of said other assembly with the inlet of the turbine section of said one assembly; combustion chamber means interposed in the fluid channel between the compressor section outlet and the turbine section inlet of said other assembly; the fluid channels from the outlet of the compressor section of said other assembly through the turbine section of said one assembly being disposed entirely between said cantilever supports whereby the channels of the heated working fluid are segregated from said cantilever supports journalling said rotors, and means at the inlet of the turbine section of said one assembly for controlling the speed of said one assembly independently of the speed of the other assembly and operable to reverse the direction of rotation of said one assembly.

3. In a gas turbine power plant, a pair of mechanically independent compressor-turbine assemblies each having a unitary rotor formed with a compressor section and a turbine section, a cantilever support at the compressor section end of each of said rotors journalling said rotors, said rotors being disposed between said cantilever supports; a housing for said rotors having fluid channels therethrough interconnecting seriatim the outlet of the compressor section of one of said assemblies with the inlet of the compressor section of the other, the outlet of the compressor section of said other assembly with the inlet of turbine section thereof, and the outlet of the turbine section of said other assembly with the inlet of the turbine section of said one assembly; combustion chamber means interposed in the fluid channel between the compressor section outlet and the turbine section inlet of said other assembly; the fluid channels from the outlet of the compressor section of said other assembly through the turbine section of said one assembly being disposed entirely between said cantilever supports and being enveloped by the fluid channel between said compressor sections, whereby said cantilever supports journalling said rotors are effectively segregated and shielded from the channels of the heated working fluid, and means at the inlet of the turbine section of said one assembly for controlling the speed of said one assembly independently of the speed of the other assembly and operable to reverse the direction of rotation of said one assembly.

4. A compact gas turbine power plant comprising first and second mechanically independent compressor-turbine rotor assemblies each having mechanically coupled compressor and turbine rotors, fluid guide structure interconnecting the outlet of the compressor of the first rotor assembly with the inlet of the compressor of the second of said assemblies and the outlet of the turbine of the second of said assemblies with the inlet of the turbine of the first of said assemblies, a first plenum connected to the inlet of the turbine of the second of said assemblies, a second plenum enveloping said first plenum and connected to the outlet of the compressor of the second of said assemblies, combustion chamber means disposed within and provided with an air intake opening into said second plenum, and means connecting the discharge end of said combustion chamber means with the said first plenum, and means at the inlet of the turbine of said first assembly for controlling the speed of said first assembly independently of the speed of the second assembly and operable to reverse the direction of rotation of said first assembly.

5. A compact gas turbine power plant comprising a first compressor-turbine assembly having mechanically coupled radial flow rotors; a second compressor-turbine assembly having mechanically coupled radial flow rotors structurally independent of the rotors of said first assembly; means mounting said assemblies in coaxial alignment with their turbine rotors in correlative adjacent disposition; a first plenum interconnecting the outlet of the turbine of said second assembly to the inlet of the turbine of said first assembly; a second plenum surrounding the inlet of the turbine of said second assembly; a third plenum surrounding said first plenum, enveloping said second plenum, and connected to the outlet of the compressor of said second assembly; at least one combustion chamber means disposed in and provided with an inlet to receive air from said third plenum, and connected to discharge into said second plenum; a fourth plenum surrounding said first three plenums and the turbine portions of said assembly and interconnecting the outlet of the compressor of said first assembly with the inlet of the compressor of said first assembly, and an exhaust duct connected to the outlet of the turbine of said first assembly and extending through the aligned ones of said plenums to the exterior of the power plant.

6. A compact gas turbine power plant comprising first and second mechanically independent compressor-turbine assemblies each comprising a pair of radial flow rotors secured together in back to back relation, one of the rotors of each of said pairs being a compressor rotor and the other a turbine rotor, a casing for each of said rotor pairs defining an axial inlet to the compressor rotor at one end, an axial outlet for the turbine rotor at the opposite end, an annular outlet peripherally disposed about said compressor rotor, and an annular inlet peripherally disposed about said turbine rotor adjacent said compressor outlet; means journalling said rotors within said casing; said compressor-turbine assemblies being mounted in coaxial alignment with their turbine outlets in correlative adjacent disposition; sheet metal fluid guide structure supported by the casings of said compressor-turbine assemblies and forming a generally annular fluid passage between the peripheral outlet of the compressor of said first assembly and the axial compressor inlet of said second assembly, a first generally toroidal plenum interiorly of the confines of said annular fluid passage and communicating with the peripheral compressor outlet of said second assembly, a second generally toroidal plenum disposed with said first plenum about and communicating with the peripheral turbine inlet of said second assembly, and a fluid channel disposed inwardly of said first plenum interconnecting the axial turbine outlet of said second assembly with the peripheral turbine inlet of said first assembly; an exhaust duct extending through said sheet metal fluid guide structure from the axial turbine outlet of said first assembly to the exterior of said annular fluid passage; and combustion chamber means disposed within said first plenum, connected to discharge into said second plenum, and supported by the walls of said plenums.

7. In a gas turbine power plant, a compressor-turbine assembly comprising a pair of radial flow rotors secured together in back to back relation, a casing for said rotors formed at its opposite ends with an axial inlet for the compressor rotor and an axial outlet for the turbine rotor and centrally with a pair of independent peripheral openings forming an outlet for said compressor rotor and an inlet for said turbine rotor, a first generally toroidal plenum surrounding said peripheral casing openings, a second and smaller generally toroidal plenum disposed wholly within said first plenum around the turbine inlet opening whereby there is direct communication between said first plenum and the compressor outlet opening and between the second plenum and the turbine inlet opening, at least one combustion chamber means disposed within said first plenum and having an inlet connected to receive compressed air therefrom, and a fluid guide duct interconnecting the discharge end of said combustion chamber means with said second plenum.

8. The combination defined in claim 7 wherein said combustion chamber means comprises a perforate wall defining a combustion chamber open at its discharge end, a fuel injector projecting through said perforate wall at the end opposite said discharge end, and a shroud surrounding and spaced from said perforate wall, said shroud having an opening at its end adjacent said wall fuel injector end and being closed at its opposite end whereby air is admitted into the combustion chamber from said first plenum through said perforate wall only through said shroud opening at the fuel injector end.

9. In a gas turbine power plant, a power plant casing, first and second coaxially aligned mechanically independent compressors disposed within said casings; first and second mechanically independent turbines disposed within said casing intermediate said compressors and coaxially aligned therewith; means mechanically coupling said first and second turbines to said first and second compressors respectively; fluid guide structure connecting the outlet of said first compressor with the inlet of said second compressor, the outlet of said second compressor with the inlet of said second turbine and the outlet of said second turbine with the inlet of said first turbine, combustion chamber means interposed in the path of fluid flow between the outlet of said second compressor and the inlet of said second turbine, and means at the inlet of said first turbine for controlling the speed and direction of rotation thereof and of said first compressor independently of the speed of said second turbine.

10. In a gas turbine power plant, a first turbine comprising a turbine casing formed with an inlet and an outlet, a turbine rotor mounted for rotation therein, and means having at least three positions of adjustment for so controlling the flow of working medium through said casing from said inlet to said outlet that said rotor is driven in one direction in one of said positions, remains at rest in a second of said positions, and is driven in an opposite direction in the third of said positions; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

11. In a gas turbine power plant, a first turbine comprising a turbine casing formed with an inlet and an outlet, a turbine rotor mounted for rotation therein, means having at least a forward, a reverse, and a neutral position in which positions respectively said means is effective to so control the flow of working medium through said casing between said inlet and outlet as to impart forward, reverse and no rotation to said turbine rotor; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine, said second compressor, said second turbine and said fuel burning means constituting a unit capable of self-sustained operation independently of the said first compressor and first turbine.

12. In a gas turbine power plant, a first turbine comprising a turbine casing formed with an inlet and an outlet, a turbine rotor mounted for rotation therein, and means having at least a forward, and a reverse and a neutral position in which positions respectively said means is effective to so control the flow of working medium through said casing between said inlet and said outlet as to impart forward, reverse, and no rotation to said turbine rotor, said means comprising a nozzle mounted in said casing intermediate the inlet thereof and the initial point of contact of the working medium upon said rotor, said nozzle being of such construction that it may be adjusted to so direct the working medium against the blades of said rotor as to impart rotation thereto in either a forward or a reverse direction or to direct the working medium through the blades of said rotor without imparting rotation thereto; a first compressor and a power output shaft driven by the rotor of said first turbine, a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

13. In a gas turbine power plant, a first turbine comprising a radial flow turbine rotor, a casing surrounding and rotatably supporting said rotor, said casing being formed with a generally annular inlet opening about the periphery of said rotor and an axial outlet at one end of said rotor, means for so controlling the velocity and direction of flow of motive fluid passing through said inlet opening as to impart forward, reverse or no rotation to said turbine rotor, said means comprising a plurality of guide vanes mounted in equiangularly spaced relation within said annular opening for pivotal movement about axes parallel to the rotor axis of rotation, a common actuator for said vanes so connected thereto that for any given position of said actuator all of said vanes assume like positions about their pivot axes relative to said rotor, said actuator being operable in one position to so neutrally position said vanes to direct the motive fluid toward the rotor axis of rotation that the motive fluid will pass to said casing outlet without imparting rotation to said rotor, said actuator being shiftable in one direction from said one position to actuate said vanes to a position to direct the motive fluid in a generally rotary path about the rotor axis to impinge upon the rotor blades and impart rotation thereto in one direction, said actuator being shiftable from said one position in a direction opposite to said one direction to actuate said vanes to a position to direct the motive fluid in a generally rotary path about the rotor axis opposite to that when said vanes are actuated in said one position whereby the motive fluid so impinges upon the rotor blades as to impart rotation thereto in the opposite direction; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

14. In a gas turbine power plant, a first turbine comprising a radial flow turbine rotor, a casing surrounding and rotatably supporting said rotor, said casing being formed with a generally annular inlet opening about the periphery of said rotor and an axial outlet at one end of said rotor, means for so controlling the velocity and direction of a motive fluid passing through said inlet opening as to impart forward, reverse or no rotation to said turbine rotor, said means comprising a plurality of guide vanes mounted in equiangularly spaced relation within said annular opening for pivotal movement about axes parallel to the rotor axis of rotation, a common actuator for said vanes so connected thereto that for any given position of said actuator all of said vanes assume like positions about their pivotal axes relative to said rotor, said actuator being operable in one position to so neutrally position said vanes to direct the motive fluid toward the rotor axis of rotation that the motive fluid will pass to said casing outlet without imparting rotation to said rotor, said actuator being shiftable in one direction from said one position to actuate said vanes to a position to direct the motive fluid in a generally rotary path about the rotor axis to impinge upon the rotor blades and impart rotation thereto in one direction, said actuator being shiftable from said one position in a direction opposite to said one direction to actuate said vanes to a position to direct the motive fluid in a generally rotary path about the rotor axis opposite to that when said vanes are actuated in said one position whereby the motive fluid so impinges upon the rotor blades as to impart rotation thereto in the opposite direction, said vanes each being elongate perpendicular to their pivot axes whereby as they are progressively actuated from their said neutral position the effective size of the fluid channels between adjacent pairs of said vanes is progressively reduced to progressively increase the velocity of fluid flow through such channels; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

15. In a gas turbine power plant, a first turbine having a radial flow rotor and means for directing a motive fluid to said rotor including means for varying the angle of incidence of the motive fluid upon the blades of the rotor to vary the effective rotation producing force applied thereto for forward and reverse drive of said rotor; a first compressor and a power output shaft driven by the rotor of said turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

16. In a power plant, a first turbine having a radial flow rotor, means for directing motive fluid to said rotor including means for varying the angle of incidence of the motive fluid upon the blades of said rotor to vary the rotative force applied thereto and comprising a plurality of adjustable motive fluid guide vanes disposed about the radial inlet of said rotor and adapted to so direct the motive fluid as to impart either forward or reverse rotation to said rotor; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel and air compressed by said compressor to provide hot combustion gases to drive said second turbine; said second compressor, said second turbine and said fuel burning means constituting a unit capable of self-sustained operation independently of said first compressor and first turbine.

17. In a power plant, a first turbine having a radial flow rotor provided with generally radially extending blades, means for directing motive fluid to said rotor including means controlling the angle of incidence of the motive fluid upon said rotor blades, said last named means being operable to direct the motive fluid against either of the faces of said blades so that said rotor can be driven in either a normally forward or a reverse direction; a first compressor and a power output shaft driven by the rotor of said first turbine; a second turbine having a second rotor; means for directing to the inlet of said first turbine gases discharged from said second turbine, a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

18. In a power plant, a first turbine comprising a radial flow rotor, means for directing motive fluid to said rotor to drive the same in either a forward or a reverse direction including a plurality of guide vanes disposed in equiangularly spaced relation about the periphery of said rotor and pivotally mounted about axes parallel to that of said rotor, and means operable to simultaneously pivot said guide vanes to adjust the angle of incidence of the motive fluid on either face of the blades of said rotor to impart either forward or reverse rotation thereto; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

19. In a gas turbine power plant, a first turbine comprising a radial flow turbine rotor having generally radially disposed blades extending from the rotor periphery toward one end, a casing for said rotor forming an annular channel surrounding the outer ends of said blades and having an axial opening at said one end of said rotor, a plurality of guide vanes pivotally mounted in said annular channel about axes equiangularly disposed about and parallel to that of said rotor and adapted to direct motive fluid against either face of said blades, a crank fixed to each of said guide vanes, a common actuator ring for said cranks operatively connected to each and mounted for rotary movement about the axis of said rotor, and a servomotor coupled to said actuator ring to vary its rotational position; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and first turbine.

20. In a gas turbine power plant, a first turbine comprising a radial flow turbine rotor having equiangularly disposed blades extending radially from the rotor periphery and axially toward one end, a casing for said rotor forming an annular channel surrounding the outer ends of said blades and having an axial opening at said one end of the rotor, a plurality of guide vanes pivotally mounted in said annular channel about axes equiangularly disposed about and parallel to that of said rotor, a servomotor, and means responsive to the actuation of said servomotor for simultaneously shifting said guide vanes about their pivot axes to direct motive fluid against either face of said rotor blades; a first compressor and a power output shaft driven by the rotor of said first turbine; a second turbine having a second rotor; means for directing to the inlet of said first turbine gases discharged from said second turbine; a second compressor driven by the rotor of said second turbine; means for directing air to the inlet of said second compressor from the outlet of said first compressor; and means for burning fuel in air compressed by said second compressor to provide hot combustion gases to drive said second turbine; said second compressor, said second turbine and said fuel burning means constituting a unit capable of self-sustained operation independently of said first compressor and said first turbine.

References Cited in the file of this patent

UNITED STATES PATENTS

| | | |
|---|---|---|
| 2,256,198 | Hahn | Sept. 16, 1941 |
| 2,312,605 | Traupel | Mar. 2, 1943 |
| 2,337,861 | Adamtchik | Dec. 28, 1943 |
| 2,428,830 | Birmann | Oct. 14, 1947 |
| 2,447,292 | Van Acker | Aug. 17, 1948 |
| 2,457,833 | Redding | Jan. 4, 1949 |
| 2,458,497 | Bailey | Jan. 11, 1949 |
| 2,479,573 | Howard | Aug. 23, 1949 |
| 2,504,414 | Hawthorne | Apr. 18, 1950 |
| 2,529,973 | Sedille et al. | Nov. 4, 1950 |
| 2,613,500 | Lysholm | Oct. 14, 1952 |
| 2,654,217 | Rettaliata | Oct. 6, 1953 |
| 2,675,195 | Herrick | Apr. 13, 1954 |
| 2,715,814 | Barr | Aug. 23, 1955 |
| 2,733,569 | Trowbridge | Feb. 7, 1956 |

FOREIGN PATENTS

| | | |
|---|---|---|
| 618,193 | Great Britain | Feb. 17, 1949 |
| 630,164 | Great Britain | Oct. 6, 1949 |
| 115,270 | Sweden | Oct. 30, 1945 |

UNITED STATES PATENT OFFICE

CERTIFICATE OF CORRECTION

Patent No. 2,895,295                                                  July 21, 1959

Paul G. Carlson

It is hereby certified that error appears in the above numbered patent requiring correction and that the said Letters Patent should read as corrected below.

In the grant, lines 2 and 12, name of assignee, for "Sola Aircraft Company", each occurrence, read -- Solar Aircraft Company --; in the printed specification, column 2, line 10, for "power plant" read -- power plants --; column 4, line 73, for "annual" read -- annular --; column 15, line 35, strike out "the".

Signed and sealed this 29th day of December 1959.

(SEAL)
Attest:

KARL H. AXLINE
Attesting Officer

ROBERT C. WATSON
Commissioner of Patents